United States Patent
Aitchison et al.

(10) Patent No.: US 12,155,056 B2
(45) Date of Patent: Nov. 26, 2024

(54) GRAPHENE ELECTRODE

(71) Applicant: Imagine Intelligent Materials Limited, Menai (AU)

(72) Inventors: Philip Aitchison, Athelstone (AU); Grant Mathieson, Athelstone (AU)

(73) Assignee: Imagine Intelligent Materials Limited, Menai (AU)

( * ) Notice: Subject to any disclaimer, the term of this patent is extended or adjusted under 35 U.S.C. 154(b) by 0 days.

(21) Appl. No.: 17/513,078

(22) Filed: Oct. 28, 2021

(65) Prior Publication Data

US 2022/0140313 A1  May 5, 2022

Related U.S. Application Data

(63) Continuation of application No. 15/526,662, filed as application No. PCT/AU2015/050722 on Nov. 17, 2015, now abandoned.

(30) Foreign Application Priority Data

Nov. 17, 2014 (AU) ................ 2014904615

(51) Int. Cl.
| | |
|---|---|
| *H01M 4/133* | (2010.01) |
| *C01B 32/192* | (2017.01) |
| *C02F 1/461* | (2023.01) |
| *C02F 1/469* | (2023.01) |
| *C02F 103/08* | (2006.01) |
| *H01G 11/24* | (2013.01) |
| *H01G 11/36* | (2013.01) |
| *H01M 4/583* | (2010.01) |
| *H01M 4/62* | (2006.01) |

(52) U.S. Cl.
CPC ........... *H01M 4/133* (2013.01); *C01B 32/192* (2017.08); *C02F 1/46109* (2013.01); *C02F 1/4691* (2013.01); *H01G 11/24* (2013.01); *H01G 11/36* (2013.01); *H01M 4/583* (2013.01); *H01M 4/623* (2013.01); *C02F 2103/08* (2013.01); *H01M 4/622* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 8,715,610 B2 | 5/2014 | Wallace et al. | |
| 2011/0284805 A1* | 11/2011 | Samulski | C01B 32/192 |
| | | | 252/502 |
| 2011/0287241 A1 | 11/2011 | Korkut et al. | |
| 2012/0308884 A1 | 12/2012 | Oguni et al. | |
| 2012/0321953 A1* | 12/2012 | Chen | H01M 4/483 |
| | | | 977/773 |
| 2013/0022811 A1 | 1/2013 | Ahn et al. | |
| 2013/0102084 A1 | 4/2013 | Loh et al. | |
| 2014/0030590 A1* | 1/2014 | Wang | H01M 4/366 |
| | | | 977/734 |
| 2014/0045058 A1 | 2/2014 | Zhao et al. | |
| 2014/0120270 A1 | 5/2014 | Tour et al. | |

FOREIGN PATENT DOCUMENTS

| | | |
|---|---|---|
| CA | 2766085 A1 | 1/2011 |
| KR | 101207463 B1 | 3/2011 |
| WO | 2012057702 A1 | 5/2012 |
| WO | 2013027561 A1 | 2/2013 |
| WO | 2014078807 A2 | 5/2014 |

OTHER PUBLICATIONS

International Search Report and Written Opinion for International Patent Application No. PCT/AU15/050722, Mailed May 16, 2016, 10 pages.

* cited by examiner

*Primary Examiner* — Karie O'Neill Apicella

(74) *Attorney, Agent, or Firm* — Berg Hill Greenleaf Ruscitti LLP

(57) ABSTRACT

An electrode with a relatively high surface area is formed substantially from graphene sheets.

7 Claims, No Drawings

GRAPHENE ELECTRODE

CROSS REFERENCE TO RELATED APPLICATION

This application is a continuation of U.S. application Ser. No. 15/526,662, filed May 12, 2017; which is a national stage application under 35 U.S.C. 371 and claims the benefit of PCT Application No. PCT/AU2015/050722 having an international filing date of Nov. 17, 2015, which designates the United States, which claims priority to Australian Patent Application No. 2014904615, filed Nov. 17, 2014, the entireties of these related applications being incorporated herein by reference.

TECHNICAL FIELD

The invention relates to the field of electrode manufacture. In particular, the invention relates to an improved electrode constructed from graphene.

BACKGROUND OF THE INVENTION

Graphene is essentially an individual layer of graphite. The utilisation of graphene is generally hampered by the tendency of graphene to form agglomerates and the poor control many production processes have over the graphene. Graphene sheets with high specific surface area, tend to form irreversible agglomerates or even restack to form graphite due to van der Waals interactions.

The prevention of aggregation is of particular importance for graphene sheets because most of their unique properties are only associated with individual sheets. Aggregation can be reduced by the attachment of other molecules or polymers onto the sheets. However, the presence of foreign stabilisers is undesirable for most applications. New strategies to produce graphene sheets in bulk quantity while keeping them individually separated are required.

Graphite, consisting of a stack of flat graphene sheets, is inexpensive and available in large quantities from both natural and synthetic sources. This ordinary carbon material is the most readily available and least expensive source for the production of graphene sheets. Mechanical cleavage of graphite originally led to the discovery of graphene sheets. However, the low productivity of this method makes it unsuitable for large-scale use. Chemical conversion from graphite appears to be a much more efficient approach to bulk production of graphene sheets at low cost. Owing to their hydrophobic nature, the direct dispersion of graphite or graphene sheets in water has been generally considered unattainable. The solution-based route involves chemical oxidation of graphite to hydrophilic graphite oxide, which can be readily exfoliated into water as individual graphene oxide sheets by application of shear.

Graphene oxide, which is electrically insulating, can be converted back to conducting graphene by chemical reduction, e.g. using hydrazine. Unfortunately, previous work has shown that unless stabilised, graphene sheets obtained through this method precipitate as irreversible agglomerates due to their hydrophobic nature. The resulting graphene agglomerates appear to be insoluble in water and organic solvents, making further processing difficult.

Existing electrode technology for capacitive deionisation and energy storage typically use activated carbons. These carbons are primarily microporous with only a relatively small fraction of mesoporosity. Micropores give large surface areas, but are slow pathways for ionic diffusion. Further, the surface area is internal to the particle of activated carbon, making the pathways long and tortuous and thus even slower. Capacitive electrodes made from the current art are thus slow to respond to changes in operating conditions.

A major factor in the end of life of capacitive electrodes is corrosion of the substrate or current collector. Electrochemistry corrodes metals, especially where oxygen is present, such as in aqueous electrolytes such as brines, acids or bases. Graphene and graphene oxide is relatively stable under these environments allowing improved resistance to corrosion.

Accordingly, it is an object of the invention to provide a graphene electrode that is not subject to at least some of the problems associated with the prior art.

SUMMARY OF THE INVENTION

The inventors have found that graphite, when treated appropriately by chemical means, can readily disperse in water to generate stable graphene oxide, graphene and graphene dispersions without the need for any polymeric or surfactant stabilisers. These dispersions can be used to form films with electrical conductivity, controlled porosity, thickness and surface area. These films can be used as electrodes in electrochemical devices, such as for energy storage (supercapacitors, batteries), capacitive deionisation (water desalination) and filtration (water, gases).

The invention provides an electrode for capacitive desalination of water and a process for making such an electrode is described. The invention also provides an electrode for capacitive energy storage and a process for making such an electrode is described. The invention also provides an electrode resistant to corrosion in electrochemical environments.

The invention allows graphene and graphene oxide-based electrodes that can be made to be primarily mesoporous while retaining high surface area and having diffusion pathways are short, allowing very fast response.

According to a first aspect of the invention, there is provided an electrode with a high surface area formed substantially from graphene sheets. Preferably, said electrode has a relatively high mesoporous volume, and is adapted for use in at least one of: capacitive separation of ions, including the capacitive deionisation of saline solutions; capacitive energy storage in aqueous media; capacitive energy storage in non-aqueous media.

Preferably, the relatively high mesoporous volume is produced by incorporation of spacers between the graphene sheets. The spacers may be: bound to the graphene sheets in a graphene dispersion; incorporated between the graphene sheets during conversion of the graphene dispersion to agglomerates; and/or incorporated between the graphene sheets during conversion of the graphene dispersion to an electrode.

The spacers may alternatively be a polymer that is also used to bind the graphene sheets together or to a substrate, preferably said polymer is cellulose (e.g. CMC) or a fluorinated polymer (e.g. PTFE, PvDF) or a rubber (e.g. SBR) or a combination on two or more of these.

The spacers may alternatively be incorporated between the graphene sheets by co-precipitation from a charge stabilised dispersion of graphene containing the spacer, or by filtration from a charge stabilised dispersion of graphene containing the spacer, or by evaporation of the solvent from a charge stabilised dispersion of graphene containing the spacer in said solvent.

The spacers may alternatively be carbon particles or fibres, including one or more of: carbon black; carbon nanotubes; carbon nano-onions and carbon nano-fibres.

The spacers may alternatively be oxide particles, including manganese oxide, titanium oxide, iron oxide, aluminium oxide, zirconium oxide, or silicon oxide.

The spacers may alternatively be silicon particles.

The spacers may alternatively be nitride particles.

The spacers may alternatively be polymers or large molecules. Preferably, said polymers or large molecule are immobile within the electrode. The polymers or large molecules may be an ionic liquid, a polyionic liquid polymer, an ionomer or a binder.

Alternatively, the mesoporous volume is produced via the assembly of graphene sheets containing defects and distortions, or produced via the assembly of graphene agglomerates containing graphene containing defects and distortions. Said defects and distortions may be curvatures of the graphene sheet or wrinkles formed by drying an aerosol of graphene dispersion, or may be curvatures of the graphene sheet or wrinkles formed by quenching graphene from high temperature, or may be curvatures of the graphene sheet or wrinkles formed by thermal reduction of graphene oxide to graphene or maybe wrinkles and bubbles formed by expansion of the graphene interlayer spaces due to volatilisation of species incorporated between the sheets. This expansion is caused by rapid thermal heating.

In another aspect of the invention, there is provided a capacitive electrode for ionic separation formed on a substrate including a graphene foil, a graphene film or a graphene coating. The graphene foil is preferably electrically conductive, flexible and mechanically robust. Preferably, the graphene foil provides all of the electrical pathway in the substrate.

Alternatively, the graphene is a coating on the surface of a metal foil, a metal film, a metal mesh, a metal cloth or a metal fibre. Preferably, the graphene coating protects the metal surface from corrosion.

Advantageously, the graphene coating provides an electrical connection between the active electrode material and the metal surface. Advantageously, said conductive fibres or mesh are embedded in, or in contact with, said graphene coating.

Now will be described, by way of a specific, non-limiting example, a preferred embodiment of the invention.

DETAILED DESCRIPTION OF THE INVENTION

The present invention relates to the uses of graphene oxide, reduced graphene oxide, graphene and films and electrodes made from them for capacitive deionisation of water and energy storage.

The graphene oxide, reduced graphene oxide and graphene prepared by the process described in U.S. Pat. No. 8,715,610 may include various forms of solution phase chemistry to further functionalise the graphene sheets to better form films and electrodes.

Graphite which consists of a stack of flat graphene sheets is inexpensive and available in large quantities both from natural and synthetic sources. Graphite oxide can be synthesised by chemical oxidation of graphite using any suitable known oxidising agents.

Graphite oxide is hydrophilic and therefore may also be prepared in the form of a graphite oxide dispersion in water.

Exfoliated graphite oxide is typically known as graphene oxide and can form well-dispersed aqueous dispersions.

Graphene oxide sheets are highly negatively charged when dispersed in water, apparently as a result of ionisation of carboxylic acid and phenolic hydroxyl groups that are known to exist on the graphene oxide sheets. This result suggests that the formation of stable graphene oxide dispersions should be attributed to electrostatic repulsion, rather than just the hydrophilicity of graphene oxide. If this electrostatic repulsion can be maintained then the graphene oxide dispersion should be able to be maintained as a stable dispersion during and after chemical reduction to graphene.

The removal of metal salts and acids such as carboxylic acid groups which often remain in the graphene oxide after reduction assist in the formation of stable graphene sheets. These residual electrolytes can neutralise the charges on the sheets, destabilising the resulting dispersions. As a consequence, it is necessary to purify the graphite oxide prior to reduction using any suitable known technique such as dialysis, filtration, and centrifugation or washing with water to remove residual salts and acids. The purified graphite oxide is exfoliated to graphene oxide by using any suitable known technique such as ultrasonication or mechanical shear.

The purified graphite oxide is exfoliated to graphene oxide by using any suitable known technique such as ultrasonication or mechanical shear for liquid dispersions. Alternatively, rapid thermal treatment of the mostly dry graphite oxide leads to partial or complete exfoliation due to volatilisation of the bound oxygen groups (epoxies, carboxyl, hydroxyl) and any incorporated species such as water, other solvents, residual acids or deliberately incorporated species.

The purified exfoliated graphite oxide which is now in the form of graphene oxide is then subjected to reduction in the presence of a base. The reduction is preferably a chemical reduction which involves adding a reducing agent to the graphene oxide to convert it to reduced graphene oxide or graphene. It will be appreciated that partial reduction of graphene oxide is possible as well as further steps to further reduce the graphene.

Examples of suitable reducing agents include inorganic reducing agents such as hydrazine or sodium borohydride and organic reducing agents such as hydroquinone, dimethylhydrazine or N,N'-diethylhydroxylamine. Preferably, the reducing agent is hydrazine. When the reducing agent is hydrazine, it may be added in an amount of one to seven grams of 35% hydrazine per gram of graphite oxide, preferably 1.5 to 5.0 grams of 35% hydrazine per gram of graphite oxide, more preferably 1.5 to 2.5 grams of 35% hydrazine per gram of graphite oxide.

Other suitable reducing agents include a wide range of chemicals in both liquid and gas phase, such as ascorbic acid, sulphur-based reducing agents (e.g. sodium sulphite, sodium bisulfite, sodium thiosulphate, sodium sulphide, thionyl chloride, sulphur dioxide), dipotassium hydrogen phosphate, oxalates, hydroxides, hydroquinone, indole, saccharides, iodides, proteins, metal hydrides, hydrogen, carbon monoxide, urea and ammonia. Some reducing agents are useful for tailored applications, such as cytocompatible ginkgo biloba extract, and dopamine. Graphene can also be reduced by heat and light.

The colloidal stability of an electrostatically stabilised dispersion is dependent on pH, the electrolyte concentration as well as the content of dispersed particles. By controlling these parameters, it has been found graphene sheets are able to form stable colloids through electrostatic stabilisation. Graphene oxide dispersions can be directly converted to stable graphene colloids through reduction under controlled conditions. The use of polymeric or surfactant stabilisers is not required, thus producing surfactant-free graphene.

In order to obtain maximal charge density on the resulting graphene sheets, a base is added during the reduction to increase the pH, preferably 6 or greater, more preferably 9 to 11. Examples of suitable bases include water soluble inorganic bases such as ammonia, sodium hydroxide, potassium hydroxide or water soluble organic bases such as methylamine ethanolamine, dimethylamine and trimethylamine. Preferably the base is a volatile base such as ammonia which can be removed after the graphene sheets are processed into solid films or composites. When the base is ammonia, it may be added in an amount of 7 to 20 g of 28% ammonia per gram of graphite oxide, preferably 8 to 16 g of 28% ammonia per gram of graphite oxide, more preferably 10 to 13 g of 28% ammonia per gram of graphite oxide. It will be appreciated that the amount of base is dependent on the type of base used.

The use of excess reducing agents such as hydrazine also renders the dispersion basic. However, hydrazine is highly toxic and usage should be minimized.

It has been observed that if graphene oxide dispersions in water with concentrations less than 0.05 wt. % are reduced by hydrazine under these conditions, the particle size of the resulting graphene sheets does not increase after the reduction is complete. Substantially no sediment is observed even after the dispersion has been centrifugation. Atomic force microscopy of the resulting graphene dispersion that has been cast on a silicon wafer shows that it is flat, with a thickness of approximately one nanometre. These results indicate that similar to the original graphene oxide dispersion, the graphene sheets remain separated in the dispersion.

The graphene oxide, reduced graphene oxide or graphene dispersions prepared by this process can be used in the development of graphene papers or films, graphene-based filters and electrodes.

Examples of electrically conducting films made from these stable dispersions of surfactant-free graphene have high electrical conductivity. After thermal annealing this has been measured at 6000 S/m.

The graphene may be deposited on substrates and membranes in any suitable form including sheets, films, paper and coatings. The formation of composites with other conductors including conducting polymers, metal or carbon nanotubes, metal nanoparticles, bucky balls or other carbon structures is also possible.

For example, it has been observed that a single layer of graphene sheets can be deposited on a substrate by drop-casting from a dilute graphene dispersion, which provides a simple method to obtain single graphene sheets for device fabrication or studies on the properties of individual sheets. Uniform graphene films can also be readily formed on a membrane filter by vacuum filtration of as-reduced dispersions. Free-standing films of graphene can be peeled off from the membrane.

The samples of vacuum-filtered graphene film can be annealed are bendable and exhibit a shiny metallic lustre. The conductivity is found to be approximately 6000 S/m at room temperature, which is comparable to that of chemically modified single-walled carbon nanotube paper.

Like many other lyophobic dispersions, once the graphene dispersions are dried, they are not dispersible in water any more, making as-prepared graphene films water-resistant. It has been recently demonstrated that strong graphene oxide films can be prepared using a similar strategy. The resulting films could find use in many fields such as membranes, anisotropic conductors and supercapacitors. Preliminary measurements show that the graphene film obtained from direct filtration of the stable graphene dispersions gives a tensile modulus up to 35 GPa, which is close to that of the graphene oxide film. It is expected that strong, conductive, flexible, and thermally stable graphene films should be more attractive than non-conductive, less thermally stable graphene oxide film for practical applications.

Scanning electron microscopy (SEM) analysis reveals that the surface of the vacuum-filtered graphene film is quite smooth and the fracture edges of the papers exhibit a layered structure through the entire cross-section, which looks similar to the microstructure obtained for graphene oxide film prepared using the same method.

These results indicate that, like hydrophilic graphene oxide sheets, chemically reduced graphene sheets can also be assembled to form highly ordered macroscopic structures under vacuum filtration-induced directional flow. The thickness of the graphene films can be varied from tens of nanometers to around 10 microns by adjusting the volume of the colloidal dispersion. Nevertheless, only stable and agglomerate-free graphene colloids can produce uniform, smooth and shiny films. In contrast to graphene oxide film, graphene films cannot be redispersed into water by ultra-sonication, exhibiting an excellent water-resistance behaviour.

The stiffness and strength of graphene film samples are found to be dependent on the thermal annealing temperature used. Both stiffness and strength increase with increasing annealing temperature up to about 220° C. The enhancement of mechanical properties is attributed to the better ordering of graphene stacks brought about by thermal annealing, which results in enhanced inter-layer contact and interactions of graphene sheets. This is consistent with the X-ray diffraction (XRD) and electrical conductivity measurements. The sample annealed at 220° C. yields the greatest mean Young's modulus at 42 GPa, and the greatest mean tensile strength at 294 MPa. Although the values are still much lower than those of individual sheets (likely due to the weaker bonding between sheets), they are both higher than those of graphene oxide film and over ten times higher than the corresponding values for flexible graphite foils. When the heat treatment is performed at temperatures above 220° C., the graphene film becomes more brittle and the measured stiffness and strength tend to decrease with annealing temperature.

Spraying techniques such as air-brushing can also be used to produce conductive graphene coatings on various substrates. Of particular significance is that owing to the high aspect ratio of the graphene sheets, a few layers of graphene sheets can result in the formation of a continuous conducting network suitable for electrode substrates.

When used in electrodes, maximum electrical efficiency of the electrode requires it be electrically conductive. To achieve this electrodes can be made by coating high surface area graphene onto a conducting substrate, such as metal or graphite foil. Metals have a tendency to corrode in electrolytes and graphite foil has reduced electrical conductivity in comparison to metal. In one embodiment of this invention, the electrode substrate is made from graphene foil, which has enhanced electrical conductivity compared with graphite foil. In another embodiment the electrode substrate is made from metal (aluminium, steel, nickel, tungsten, tantalum etc.) sheets or mesh. And in yet another embodiment the substrate is made from conducting material (metal, carbon fibre) coated with high conductivity graphene. The coating of low porosity graphene protects the metal from corrosion and the metal enhances the electrical conductivity of the substrate over the distances required in assembled cells. In some embodiments the coating of graphene covers the metal completely and in other embodiments covers the metal only where it could contact the electrolyte.

In another embodiment the substrate is made substantially from high electrical conductivity graphene containing embedded fibres or filaments of higher conductivity materials, such as metals or carbon fibres.

High surface area electrodes can be used for capacitive separation of ions for desalination by capacitive deionisation (CDI) or energy storage in electrochemical double-layer capacitors (EDLC) also known as supercapacitors and including hybrid devices with capacitive electrodes.

Deposition of high surface area graphene onto a conductive substrate can form an electrode for CDI or an EDLC.

As individual sheets, graphene has a high surface area, being approximately 2600 square metres per gram. However, the tendency of graphene to re-agglomerate solved by the method of producing fully dispersed and surfactant free graphene described here, can also be a problem for the process of making electrodes. During deposition onto a substrate the concentration of graphene increases and agglomeration occurs. Agglomerates of graphene have greatly reduced surface area compared to the free sheets. To ensure the graphene has a maximal surface area the sheets need to be prevented from agglomeration and retain at least meso-porous structure to allow electrolyte access.

Agglomeration into multi-layer graphene/graphite can be prevented by disrupting the long range structure of the graphene sheets so that they can no longer pack tightly. This can be achieved by a number of mechanisms. In one embodiment the binder used to make capacitor, battery and CDI electrodes is trapped between the graphene layers as the electrode is formed. In another embodiment spacer particles, polymers or molecules are included before or during electrode formation, such as by grafting to the highly dispersed graphene or by co-precipitation. In another embodiment the spacer particles are active materials, such as metal oxides that add functionality to the capacitive electrode as well as acting as spacers. In a further embodiment the repacking of the graphene layers is inhibited by introducing distortions into the graphene layers, such as curvature or wrinkling of the sheets.

Graphene and other large thin sheets have a tendency to minimise their free energy by wrinkling and curling, so this last feature may be seen in all embodiments, but differs from the deliberate exaggeration and kinetic inhibition described herein as an embodiment of preventing restacking of the graphene.

A method for forming the electrodes described herein can comprise the steps of dispersing graphene in water or other solvents and adding a binder to the dispersed graphene to form a mixture. The weight ratio of the graphene to the binder can range from 25:75 to 99:1. More preferably the ratio is from 90:10 to 98:2. The mixture is then dried to remove the water or the other solvents. In some embodiments it can then also be formed under pressure into a desired shape.

Suitable binders may be selected from cellulosic materials (e.g. CMC), rubbers, and fluorinated resins (e.g. PVdF, PTFE).

In some cases, the spacers are binder particles or molecules. In others, the binder and the spacer are different materials (e.g., a binder and fine carbon black particles as a spacer). Spacer particles and molecules are intended for preventing or reducing the re-stacking of graphene sheets.

Graphene sheets can be mixed with spacer particles or molecules only (without a binder) to form an electrode, implying that it is not necessary to use a binder to form an electrode and, hence, one can incorporate a higher proportion of graphene for enhanced specific capacitance. A binder or adhesive is typically still needed to bond the graphene-based electrode layer to a current collector.

In other embodiments the restacking of the graphene is prevented by explicitly including spacers between the graphene sheets. These spacers can comprise surface modifications to the graphene sheets, such as surface deformations or attached polymers or particles.

In one embodiment the spacers are polymers incorporated between the graphene sheets. In some embodiments the polymers are electrically conductive to maximise the electrical conductivity of the electrode.

In another embodiment the spacers are particles of mostly chemically inert material such as carbon black, activated carbon, carbon nanotubes, carbon nano-onions, carbon nano-fibres and other carbon allotropes or forms of carbon. In other embodiments the inert particles are oxides, such as alumina, zirconia or silica or non-oxides such as silicon, carbides or nitrides depending on the media the electrode is used in.

In another embodiment the spacers are particles of chemically reactive materials, such as metal oxides which contribute additional functionality, such as pseudo-capacitance in capacitors or selective adsorption of impurities from water streams in CDI.

In a further embodiment the spacers are molecules that will remain between the graphene sheets during operation of the electrode. For example, large organic salts can be sterically locked in place by the graphene re-agglomeration, but prevent restacking and maintain high accessible surface area by other electrolytes, including other, more mobile ionic liquids. Spacer molecules can include binders, polyionic liquid polymers, ionomers and ionic liquids amongst others.

A method of forming graphene electrodes with high surface area accessible by electrolytes involves using distorted graphene sheets, platelets or ribbons. Instead of using a spacer to prevent sheet restacking these distorted sheets of graphene do not restack thereby maintaining a meso-porous structure having a pore size greater than two nanometres, preferably greater than four nanometres.

Oxidation of graphite to graphene oxide introduces defects where oxidation has occurred. Controlled reduction of the defective graphene oxide can maintain those defects forming graphene with non-idealised structure. These imperfections are due to departure from the ideal six membered ring structure of graphene, introducing strain and thus curvature or wrinkles.

Curved graphene sheets can be formed by spray drying aerosols of dispersed graphene. It is hypothesised that the high surface tension of the small droplets and rapid drying introduce defects in the graphene sheet that cause sheet curvature. This curvature substantially prevents restacking of the graphene.

In an embodiment of a method of the present invention, an aqueous dispersion of graphene oxide nanosheets is spray-dried to form granules of graphene oxide. In some embodiments, the aqueous suspension also includes structural modifiers that modify the morphology of the granules. In some embodiments, the structural modifier is a salt having volatile components (e.g., ammonium bicarbonate). In some embodiments, the graphene oxide granules are reduced so as to modify their electrical properties. In some embodiments, the reduced graphene oxide granules are combined with a binder to form an electrode.

In another method of introducing distortion into the graphene sheets, the graphene can be rapidly cooled, or quenched to cause distortion of the graphene sheets. In one embodiment this is done by rapid cooling of heated graphene by quenching in liquid nitrogen. In another embodiment graphene oxide is simultaneously converted to graphene by thermal reduction at up to 900° C. followed by quenching in liquid nitrogen.

In another embodiment of the invention, graphene sheets are rapidly heated to volatilise incorporated species between the layers of sheets. The incorporated species can form gases that expand and force the graphene sheets apart. The species are sometimes bound, such as epoxy or carboxy functionality, or intercalated, such as acids or other charged species, or may include solvents and additives.

It will be obvious that combinations of the above methods are possible and may deliver an optimised electrode structure.

Methods for the incorporation of spacers can take many forms and include co-precipitation of graphene and the spacer particles, polymers or molecules. This co-precipitation can be induced by changing the graphene stability by addition of salts, changes in pH or concentration. In one embodiment simple filtering of the mixed dispersion of spacer and graphene produces a high surface area electrode. In another embodiment addition of salts causes the graphene and spacer to co-precipitate and give an electrode material with spaced apart graphene sheets. The salt may be an electrolyte compatible with the intended medium of operation, such as sodium chloride for electrodes intended for CDI or ionic liquids for supercapacitors. In another embodiment spray drying of the dispersion produces particles of graphene incorporating spacers between the sheets.

Another method for the incorporation of spacers is by reduction of dispersions of graphene oxide in the presence of the spacers. For example reduction to graphene in the presence of cationic poly(ethyleneimine) (PEI) results in water-soluble PEI-modified graphene sheets that can be used to form electrodes. In one embodiment the reduction of graphene oxide in a dispersion with carbon black formed composites with the carbon black spacing apart the basal surfaces the graphene. In other embodiments thermal reduction (by heat or laser) reduces the graphene oxide to graphene and entraps spacers within the graphene layers.

Other forms of graphene can be equally formed into electrodes or materials for electrodes using the processes described here. In one embodiment the graphene has been fluorinated.

Equally other methods of forming the graphene structures for the electrodes can be used, such as evaporation, coating, precipitation, filtering, spray drying, compounding and mixing amongst others and combinations of these.

In one method for the formation of spaced-apart graphene sheets for electrodes, template particles, polymers or molecules can be included between the graphene sheets and then removed later. In one embodiment a solvent can be included during the precipitation of the graphene and then removed by evaporation after the graphene sheets are locked in place with each other and form a mesoporous structure. In another embodiment polymers or polymer particles can be included in graphene oxide and then carbonised to form spacers during thermal reduction of the graphene oxide to graphene. In another embodiment the polymer is removed during the reduction process leaving a void and defects between the graphene sheets.

A method for preparing graphene with mesoporous structure by colloidally dispersing negatively charged graphene oxide (GO) sheets with positively charged mesoporous silica particles. The silica particles are then used as template for replicating mesoporous carbon spheres (MCS) using chemical vapour deposition, during which the GO sheets were reduced. Removal of the silica particles leaves behind porous structure with slightly crumpled graphene sheets intercalated with mesoporous carbon spheres.

The present invention will now be described with reference to the following non-limiting examples.

Example 1—Graphite oxide was synthesised from graphite by applying the Hummers method with an additional dialysis step used to purify the product. As-synthesized graphite oxide was suspended in water to give a brown dispersion, which was subjected to dialysis to completely remove residual salts and acids. As-purified graphite oxide suspensions were then dispersed in water to create a 0.05 wt. % dispersion. Exfoliation of graphite oxide to graphene oxide was achieved by ultrasonication of the dispersion using for 30 min. The obtained brown dispersion was then subjected to 30 min of centrifugation at 3000 RPM to remove any unexfoliated graphite oxide (usually present in a very small amount). In order to achieve chemical conversion of graphite oxide to graphene, the resulting homogeneous dispersion (5.0 mL) was mixed with 5.0 mL of water, 5.0 µL of hydrazine solution (35 wt. % in water) and 35.0 µL of ammonia solution (28 wt. % in water) in a 20 mL-glass vial. After being vigorously shaken or stirred for a few minutes, the vial was put in a water bath at 95° C. for 1 h. The excess hydrazine in the reaction mixture can be removed by dialysis against a dilute ammonia solution.

Example 2—Graphene films were fabricated by vacuum filtration of graphene dispersions. In a typical procedure, graphite oxide was synthesized from natural graphite powder using a modified Hummers method. After being purified by filtration and subsequent dialysis or by several runs of centrifugation/washing, graphite oxide was exfoliated into water by ultrasonication for 30 min. The obtained graphene oxide was diluted to 0.25 mg/mL. With the pH of the dispersion adjusted to 10 using ammonia and the solution surface covered with a thin layer of mineral oil, the dispersion was then subjected to reduction at 95° C. by hydrazine for 1 h. Graphene films (approximately 6 micron thick) were made by filtration of a measured amount of the resulting colloid through an Anodisc membrane filter (47 mm in diameter, 0.2 micron pore size), followed by air drying and peeling from the filter. These graphene films were annealed at different temperatures in air (<220° C.) or argon (>220° C.) for 1 hour before being cooled down to room temperature.

Example 3—Graphene powders were formed by drying dispersions of graphene in water. These graphene powders were mixed with carbon black and PvDF in ratios ranging from 13:10:4 and 90:5:5 in ethanol. The resulting slurries were cast onto graphene paper using doctor blade and dried at 80 degrees Celsius to form electrodes.

Example 4—Graphite foils were coated with a slurry of Ketjen black, dried at 80 degrees Celsius and then coated with samples of the slurries from Example 3.

Example 5—The graphene electrodes from Examples 3 & 4 were cut to 4×4 cm, leaving a 1 cm wide, 2 cm long tab. A 0.5 cm hole was punched in the centre of the electrode. The electrodes were assembled in a face-to-face arrangement in an Ecomite-U capacitive deionisation housing for testing. Desalination was performed using simulated seawater solutions of sodium chloride (NaCl) at voltages between 0.8 and 1.3V with pulse widths ranging from 1 to 10 seconds. The effluent conductivity was measured with a conductivity meter.

Example 6—A slurry of graphene in ethanol was coated onto carbon-black primed aluminium foil, cut into 2 cm by 20 cm electrodes and rolled together with a paper separator to form a rolled capacitive deionisation cell. Simulated seawater (35 g/L of sodium chloride (NaCl) in water) was forced through the rolled cell with a syringe whilst a potential of 1.2V was applied.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. An electrode having a relatively high mesoporous volume comprising:
   a substrate and surfactant free graphene sheets, wherein the graphene sheets are coated onto the substrate to make an electrically conductive electrode;
   wherein spacers are bound to the graphene sheets in a graphene dispersion by one of: (a) incorporation between the graphene sheets during conversion of the graphene dispersion to agglomerates, and (b) incorporation between the graphene sheets during conversion of the graphene dispersion to an electrode.

2. An electrode according to claim 1, wherein the graphene dispersion comprises a binder, wherein the weight ratio of the graphene to the binder ranges from 25:75 to 99:1.

3. An electrode according to claim 1, wherein the graphene dispersion comprises a binder, wherein the weight ratio of the graphene to the binder ranges from 90:10 to 98:2.

4. An electrode according to claim 1, where the spacers are at least one of carbon particles or fibers selected from a group including carbon black, carbon nanotubes, carbon nano-onions and carbon nano-fibers.

5. An electrode according to claim 1, where a polymer is used to bind the graphene sheets together or to a substrate.

6. An electrode according to claim 5, where said polymer is selected from the group consisting of CMC, SBR, PvDF and PTFE.

7. An electrode having a relatively high mesoporous volume comprising:
   a substrate and surfactant free graphene sheets, wherein the graphene sheets are coated onto the substrate to make an electrically conductive electrode;
   wherein spacers are bound to the graphene sheets in a graphene dispersion, incorporated between the graphene sheets during conversion of the graphene dispersion to agglomerates and incorporated between the graphene sheets during conversion of the graphene dispersion to an electrode.

* * * * *